March 6, 1945.                E. G. MILLER ET AL                2,370,872
                        GEARED MAGNETIC CLUTCH AND MOTOR
                              Filed Jan. 18, 1943
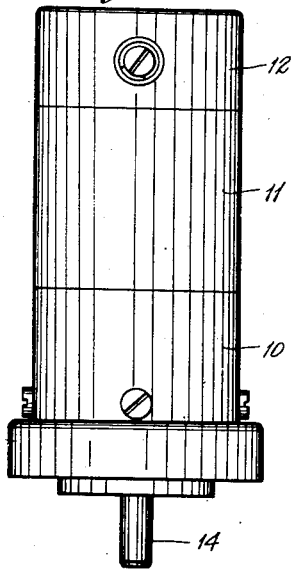
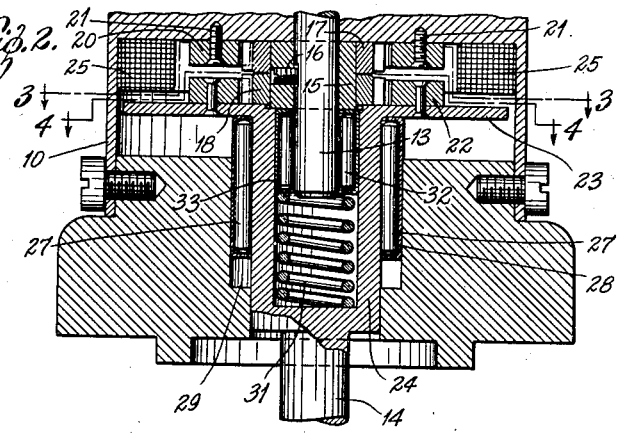
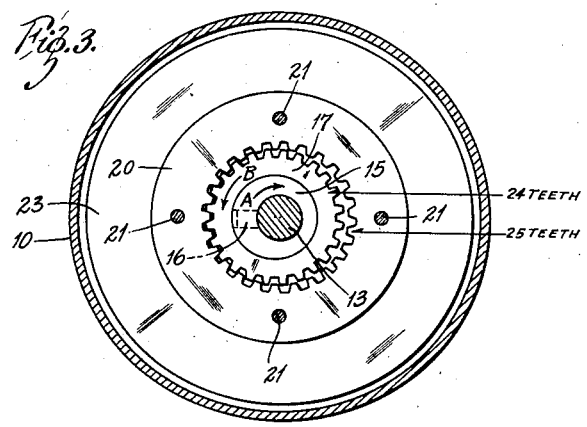
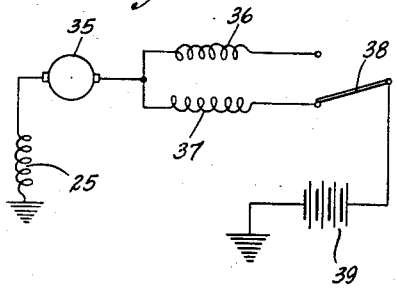
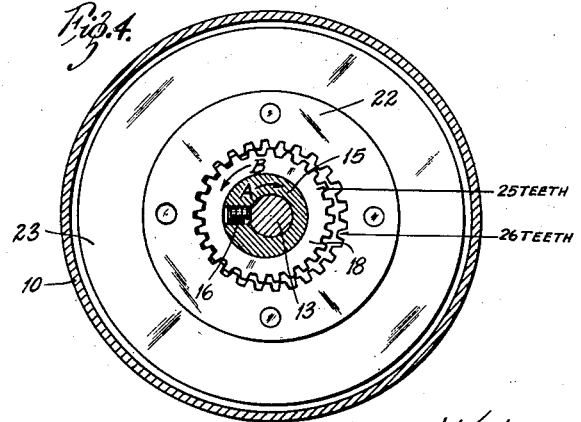
INVENTORS:
EDWARD G. MILLER,
RALPH E. ENGBERG,
ATTORNEYS.

Patented Mar. 6, 1945

2,370,872

UNITED STATES PATENT OFFICE 2,370,872

GEARED MAGNETIC CLUTCH AND MOTOR

Edward G. Miller and Ralph E. Engberg, Clayton, Mo.

Application January 18, 1943, Serial No. 472,748

6 Claims. (Cl. 172—239)

The present invention is directed to a geared magnetic clutch and motor. A broad purpose of the invention is to provide a magnetic clutch in combination with a motor or power means, and a gear reduction to provide positive engagement without slippage when the clutch is energized.

A specific object of the invention is to provide a magnetic clutch, so combined with a gear reduction as to provide transmission of the forces of rotation through the gearing, thus eliminating the necessity of depending upon the magnetic attraction for providing the forced transmission.

A further object is to provide a mechanism of this type providing a high speed reduction permitting the use of a high speed motor for greater efficiency in obtaining high torque output.

A further object is to provide in this combination a planetary gear mechanism without a sun gear required between the pinions and internal gears, and without the conventional arm for supporting the planetary gears.

A further object is to provide a clutch and gear mechanism of this type by which the magnetic clutch may readily obtain engagement of the gears at all times.

A further object is to provide a mechanism of this type wherein the clutch is energized to mesh the gears at the same time the motor is energized to start rotation of the driving shaft, thus insuring that ready meshing of the gears can be obtained. More specifically, an object is to provide a clutch engaging mechanism to mesh gears and operate a driven shaft from a drive shaft, with the engagement effected with a relatively low speed gear, operating fast enough to prevent binding of the gears, but slow enough to avoid clashing.

In the drawing:

Fig. 1 is an external elevation of the device;

Fig. 2 is a diametrical section through the clutch and gear mechanism;

Fig. 3 is a section on the line 3—3 of Fig. 2, showing the upper gear connections;

Fig. 4 is a section on the line 4—4 of Fig. 2, showing the lower gear connections; and Fig. 5 is a wiring diagram of a desirable arrangement for the mechanism.

The mechanism is here shown as including a lower clutch section 10, a motor section 11, and a cap section 12.

The motor section includes an electric motor that is adapted to rotate a drive shaft 13. Through the gear mechanism, to be described, the drive shaft rotates a driven shaft 14 at a much reduced speed.

The driving means includes a circular eccentric 15 secured by a set screw 16 to the drive shaft. The eccentric 15 is of an axial length to receive two superposed pinions that may be welded together. The upper of these pinions is shown at 17, and the lower at 18.

The upper pinion 17 meshes with a ring gear 20, secured by screws 21 to the end plate of the housing 10. The ring gear 20 is concentric with the motor shaft, but the pinion gear 17 is eccentric to the motor shaft, being concentric with the circle of the cam 15.

The pinion 18 is adapted to mesh with a ring gear 22 that is secured to a disc 23 of magnetic material. The disc 23 is an integral part of a hollow circular enlarged portion 24 on the driven shaft 14. Thus, rotation of the ring gear 22 will cause rotation of the driven shaft.

The disc 23 extends out adjacent a magnetic coil 25, that is secured in the extension of the housing 10, so that the disc will be within the field of the magnetic coil 25.

Quill rollers 27 provide a bearing. These quills are mounted in a bearing race 28 that is vertically slidable in an enlargement 29 of the drive shaft opening. As will be seen, this enlargement 29 is of sufficient length to permit the bearings to slide with the driven shaft a sufficient distance to disengage the ring gear 22 from its pinion 18.

The enlargement 24 of the driven shaft is hollow and receives a spring 31. Quills 32 in turn operate in a race 33, engaging between the bottom of the eccentric and the spring 31 so that the force of the spring tends to displace the driven shaft 14 and its integral disc 23 downwardly. This action will disengage the ring gear 22 from its pinion 18. The quills 32 provide a bearing between the motor shaft 13 and the driven shaft 14.

To illustrate one connection for this mechanism, Fig. 5 shows a wiring diagram in which the motor is shown at 35. This motor has a forward winding 36 and a reverse winding 37. The clutch coil 25 is put in series with the motor, to be energized when either motor winding is in circuit. A selector switch 38 is provided to select one or the other of the two motor windings and to connect the same with the source of power 39. Grounding of one end of the coil 25 and of one end of the battery provides for completing the circuit.

Operation

For illustrative purposes, the pinion 17 is shown as having 24 teeth, the ring gear 20 as having 25 teeth, the pinion 18 as having 25 teeth, and the ring gear 22 as having 26 teeth. These particular values are chosen so as to illustrate the operation. They will give a reduction of 624 to 1 between the motor shaft 13 and the drive shaft 14.

A mechanism of this type may be used for many purposes, such as for the operation of a valve between open and closed position. Some external means will operate the switch 38. One typical control very well known in the art for this purpose is a room thermostat.

If the switch 38 assumes the position shown in Fig. 5, it will simultaneously supply energy to the motor winding 37, the armature 35 of the motor and to the coil 25. This will have brought about the condition shown in Fig. 2.

In this condition, the coil 25 will have attracted the disc 23 to lift the ring gear 22 into mesh with the pinion 18. The motor shaft 13 will be rotating to rotate the circular eccentric 15, thereby to rotate both pinions 17 and 18.

The ring gear 20 is fixed. Consequently, each rotation of the circular eccentric 15 of the motor shaft 13 rolls the pinion 17 about the ring gear 20. Since the ring gear has 25 teeth and the pinion 24 teeth, the net result of a single revolution of the eccentric is a displacement of the pinion $1/24$ of a revolution in the direction of the arrow B. This net result of $1/24$ of a revolution of the pinion in the direction of the arrow B comprises one full revolution of the eccentric in that direction plus an extra $1/25$ revolution.

Since the two pinions 17 and 18 are secured together, the pinion 18 will correspondingly make one and $1/24$ revolutions in the direction of the arrow B for each rotation of the motor shaft. If it be assumed that the eccentric 15 is held still while the pinion 18 makes this one and $1/24$ revolutions in the direction of the arrow B, the driven ring gear 22 would likewise make the same number of revolutions.

For each revolution of the pinion 18 about its own axis, and assuming the eccentric held still, the ring gear 22 makes $25/26$ of a revolution. Consequently, $25/24$ of a revolution of the pinion 18 will produce $625/624$ of a revolution of the ring gear 22 in the direction of the arrow B under these conditions.

However, while the pinion 18 is rotated by its attachment to the pinion 17, it is also rotated by the eccentric 15. If it be assumed that the pinion 18 is fixed to the eccentric, such rotation by the eccentric would produce one revolution of the pinion 18 in the direction of the arrow A.

The net result is that the ring gear 22 will move the resultant of these two movements, which is one revolution in the direction of the arrow A minus $625/624$ revolutions, which gives a net result of $1/624$ revolution in the direction of the arrow B. The gear reduction, therefore, is 1 to 624, with the driven shaft 14 rotating in the direction opposite to the motor shaft 13.

It will be observed that this reduction has been accomplished through the use of the eccentrics rather than through the use of attached arms and the addition of sun gears.

When the switch 38 is displaced to open the motor coil, the magnetic coil is released and the spring 31 separates the ring gear 22 from its pinion 18. This will occur quickly and will relieve the driven shaft 14 of substantially all of the overtravel of the motor.

Upon reenergization of the coil 25 through action of the switch 38, the motor will start rotation very promptly, putting the pinion 18 into rotation at a relatively slow rate of speed. The motor will be rotating prior to the time the magnetic force can bring the disc 23 high enough to begin engagement of the ring gear 22 with its pinion 18. While this speed is slow, it is sufficient to insure meshing of the ring gear 22 with the pinion 18 without blockage and without clashing of the gears.

The ratio of reduction is a matter of choice. Also, while it is desirable in many cases to have the motor positively driven in both directions, in other cases, the drive may be in a single direction. Such might be the case in connection with the valve that is positively opened or closed by a spring, and motor driven in the other direction. In this case, each time the motor opens the valve, means would be provided to hold it open. Thereafter, when conditions were satisfied by the valve, a release would be effected to have the valve close under the spring action, after which a subsequent operation in the same direction of the motor would reopen it.

Likewise it is desirable, but not essential, to have the magnetic clutch coils energized upon energization of the motor. However, the motor may be independently operated, as for instance, for constant operation, with the clutch intermittently operated by some separate control.

What is claimed is:

1. In a mechanism of the kind described, a drive shaft, means for driving the shaft, a driven shaft, a gear reduction means, including a reduced speed gear rotated by the driving shaft at a speed below that of the driving means, and a gear adapted to be caused to mesh with the reduced speed gear, and connected with the driven shaft, and magnetic means adapted to be energized with energization of the driving means to cause the driven shaft gear to mesh with the reduced speed gear on the driving shaft.

2. In a mechanism of the kind described, an electric motor having an operating winding, a gear reduction mechanism operated by the motor and including a reduced speed gear driven at a speed below that of the motor, a driven shaft, a gear connected with the driven shaft and adapted to be meshed with said reduced speed gear, a magnetic coil in series with the motor operating winding, a magnetic means cooperable therewith to bring the driven shaft gear into mesh with the reduced speed gear whenever the motor winding and the magnetic coil are energized.

3. In a mechanism of the kind described, a base, a driving shaft mounted on the base, a pair of planetary gears rotatable together, means on the driving shaft for displacing the planetary gears about their axes and about the axis of the motor shaft, a first ring gear for controlling the rotation of the planetary gear, a second ring gear mounted on the driven shaft, means to separate the second ring gear from engagement with the planetary gears, and magnetic means between the base and the driven shaft energizable to overcome said separating means and to cause the ring gear on the driven shaft to mesh with said planetary gears.

4. In a mechanism of the kind described, a base, a driving shaft thereon, a circular eccentric mounted for rotation with the driving shaft, a planetary gear means mounted for rotation on the circular eccentric about the center thereof and by the eccentric about the driven shaft axis, a first ring gear fixed to the base, and engageable with the planetary gear means to determine the rotation thereof upon rotation of the driving shaft, a driven gear means also engageable with the planetary gear means for rotation thereabout, magnetic elements, one of which is a magnetic coil, one of said elements being secured to the base, and the other being secured to the driven gear to displace the same in one direction relative to the planetary gear means, and additional means to displace the driven gear relative to the planetary gear means in the other direction, whereby the driven shaft may be engaged or disengaged from the driving shaft.

5. In a mechanism of the kind described, a motor having a forward and a reverse winding, a magnetic coil in series with said motor, a control switch movable to select either of said motor windings for energization, said magnetic coil being energized when either of said windings is energized, a drive shaft operated by the motor, a driven shaft, magnetic elements, one connected to the motor and one connected to the driven shaft, and one being said magnetic coil, and gear means adapted to be meshed to connect the driving shaft with the driven shaft, said gear means including the driven gear connected with the driven shaft and also connected with the magnetic element of the driven shaft, whereby when said magnetic coil is energized, the said magnetic elements will be mutually attracted and the driven gear will be meshed to effect driving of the driven shaft by the driving shaft.

6. In a mechanism of the kind described, a driving shaft, electrical means for driving the shaft, a driven shaft separate from the driving shaft but coaxial therewith, gear reduction mechanism including a reduced speed gear, and means operated from the driving shaft to operate the reduced speed gear when the driving shaft is operated, but at a slower speed, a driven gear connected with the driven shaft whereby rotation of the driven gear effects rotation of the driven shaft, said gears being relatively displaceable by movement of one of them into and out of mesh with the other, electro-magnetic means for effecting said displacement, and means connecting the electro-magnetic means and the electrical driving means for energization together, whereby when the driving means is started, the shafts will be engaged through the gearing.

EDWARD G. MILLER.
RALPH E. ENGBERG.